Feb. 3, 1959 H. D. HUME 2,872,214
TRAILER HITCH RESILIENT ABOUT HORIZONTAL TRANSVERSE PIVOT
Filed Oct. 9, 1953 3 Sheets-Sheet 1
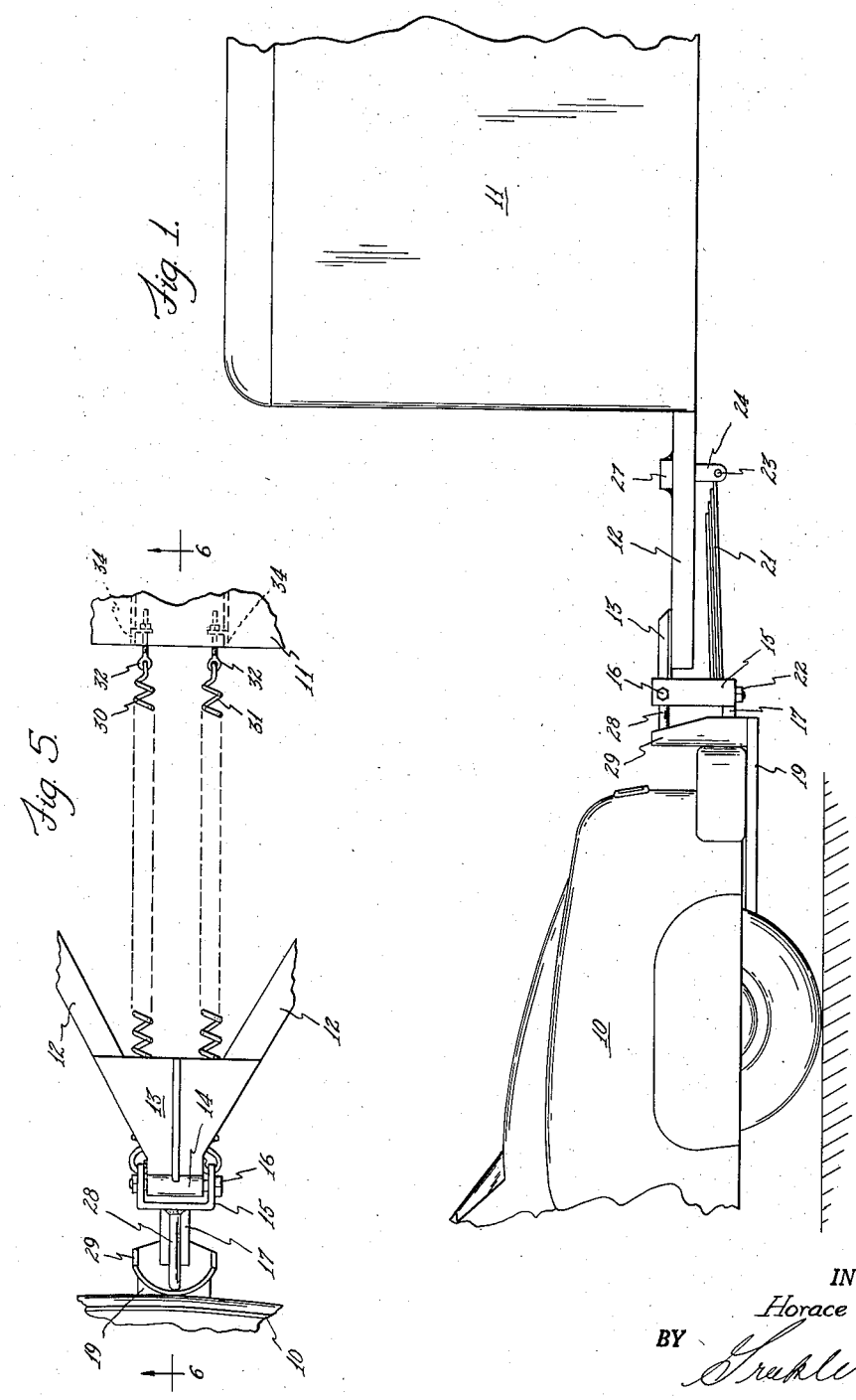
INVENTOR.
Horace D. Hume
BY
Atty.

Feb. 3, 1959 H. D. HUME 2,872,214
TRAILER HITCH RESILIENT ABOUT HORIZONTAL TRANSVERSE PIVOT
Filed Oct. 9, 1953 3 Sheets-Sheet 2
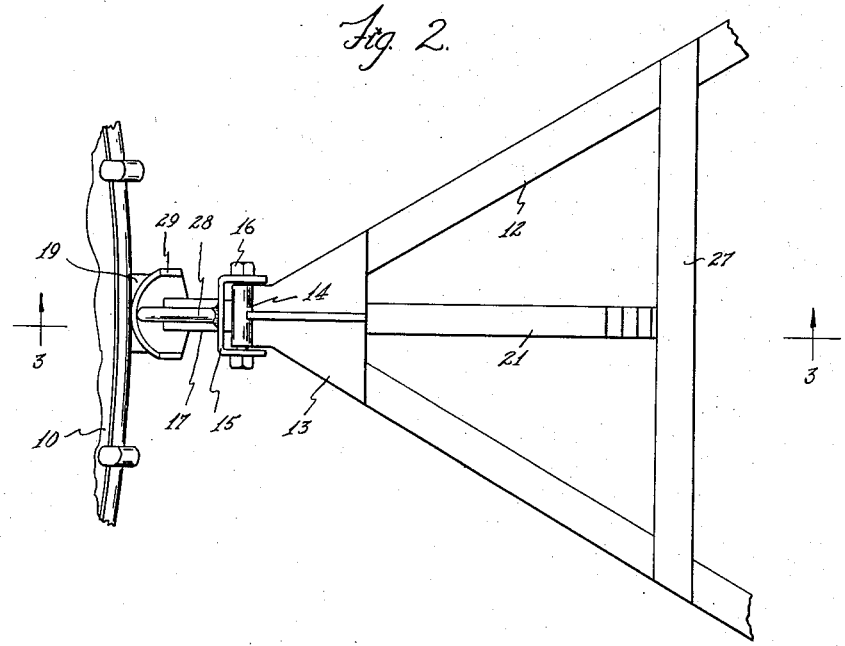
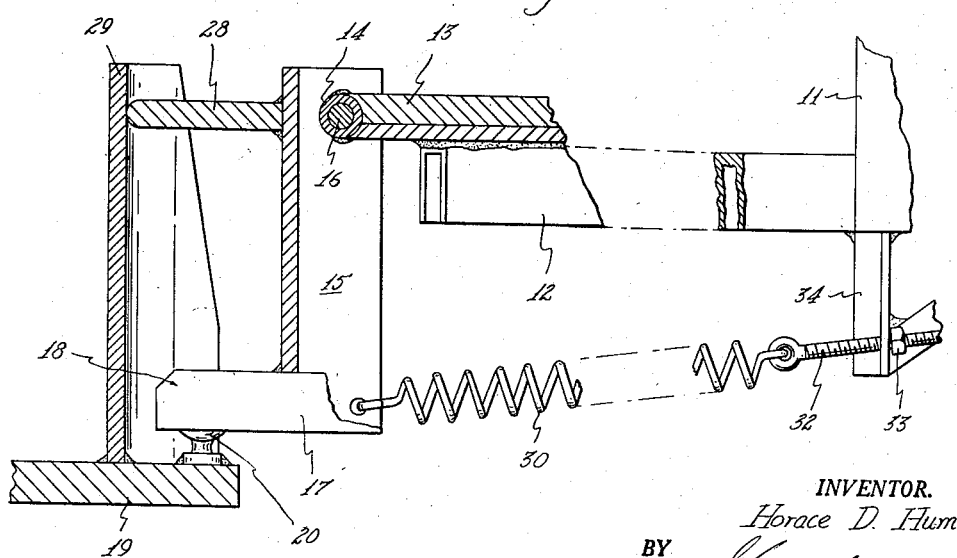
INVENTOR.
Horace D. Hume
BY
Atty.

Feb. 3, 1959 H. D. HUME 2,872,214
TRAILER HITCH RESILIENT ABOUT HORIZONTAL TRANSVERSE PIVOT
Filed Oct. 9, 1953 3 Sheets-Sheet 3
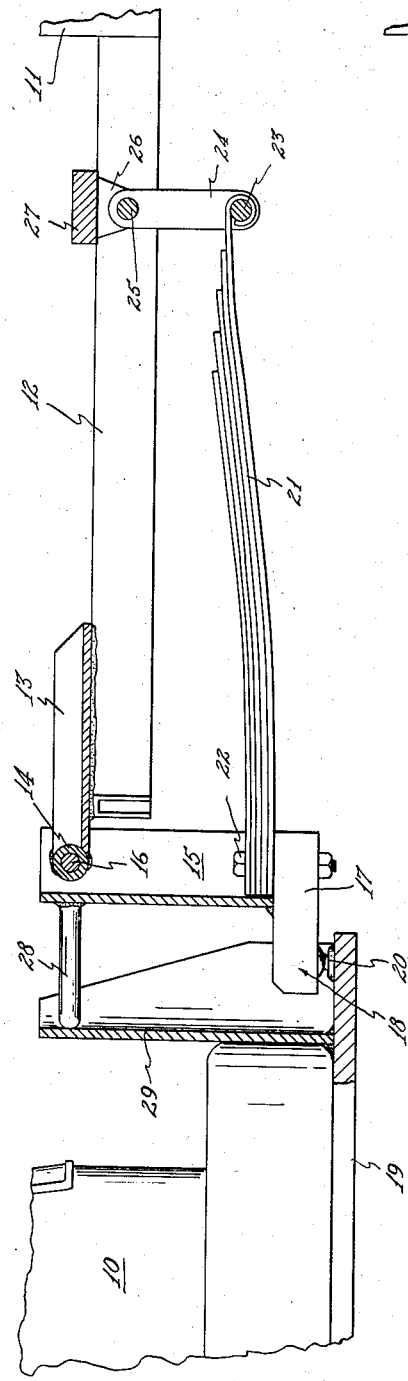
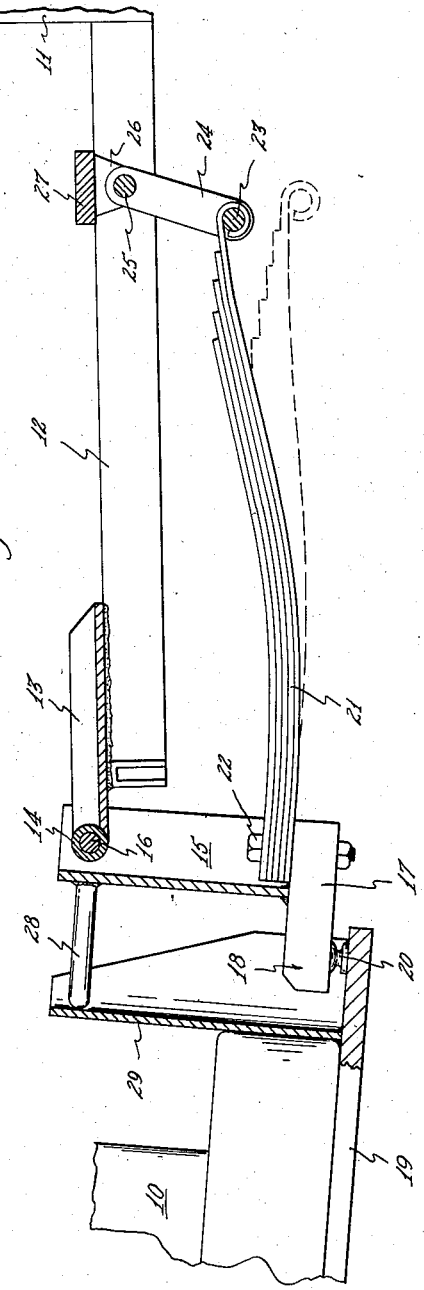
INVENTOR.
Horace D. Hume
BY
*Truhlwells*
Atty

2,872,214

TRAILER HITCH RESILIENT ABOUT HORIZONTAL TRANSVERSE PIVOT

Horace D. Hume, Mendota, Ill.

Application October 9, 1953, Serial No. 385,163

2 Claims. (Cl. 280—489)

The present invention relates to improvements in trailer hitches.

It is common practice in attaching trailers to powered vehicles, to provide a universal connection between the towing frame of the trailer and the rear of the automobile. The difficulty with this type of connection is that the weight of the front end of a two wheel trailer is transmitted to the connection, causing a great deal of sag. The rear of the automobile is depressed and there is a tendency for the front wheels to be raised from the ground. Aside from increased wear on the towing vehicle, this sag and the resulting lessening of weight on the front or steering wheels of the vehicle causes dangerous side sway and floating of the front of the vehicle as it travels along the roadway. Each bump in the road gives rise to a downward pulse on the universal connection which lifts the front of the vehicle and removes steering control from the operator.

It is the purpose of my invention to provide means for stiffening the universal connection between the vehicles to prevent sag and transfer more of the trailer weight to the trailer wheels. A further purpose of my invention is to provide a damping means to restrict the side sway of the trailer during travel.

In my previous patents, No. 2,493,874 and No. 2,549,814, I have disclosed means to offset the tendency toward sag and side sway which utilized several connectors between the trailer and the powered vehicle. In my present invention there is only one connection between the trailer and the auto which must be fastened and unfastened for attaching and releasing the two vehicles.

In my prior patents the stiffening means are positioned below the universal connector while it is secured to the automobile above the axis of the rear wheels of the auto. In my present invention, I provide stiffening means above the axis of the vehicle, which makes it possible to place the universal connection below the axis of the rear wheels. In this manner, the horizontal force exerted by the trailer on the towing vehicle, as it is being pulled, causes a turning moment about the axis of the rear wheels, which opposes the turning moment resulting from the weight of the front of the trailer on the rear of the towing vehicle.

I accomplish this result by pivotally securing a depending channel section from the front of the tow frame of the trailer. The universal connection to the automobile is secured to the lower end of this depending member, and to an auxiliary frame extending rearwardly from the automobile body. This auxiliary frame also carries a curved wear plate which extends upwardly in front of the universal connection. The depending channel mounts, near its upper edge, a forwardly extending push bar, adapted to bear against the wear plate to limit the pivotal movement toward the wear plate of the depending channel about the universal connection. A leaf spring is mounted near the lower end of the depending channel and extends rearwardly to a link rotatably suspended from the tow frame near the front of the trailer body.

With this construction, as the trailer weight is placed on the universal connection, the connection is pushed downwardly with respect to the front of the trailer body. This movement must flex the leaf spring against its natural bend, and thus is limited by the spring.

The nature and advantages of my invention will appear more clearly from the following description and the accompanying drawings wherein a preferred form of the invention is shown. The description and drawings are illustrative only, however, and should not be considered as limiting the invention except insofar as it is limited by the claims.

In the drawings:

Figure 1 is a view in side elevation of a trailer and powered vehicle utilizing my improved trailer hitch;

Figure 2 is an enlarged plan view of the invention;

Figure 3 is an enlarged sectional view of the invention taken substantially on the line 3—3 of Figure 2;

Figure 4 is a view similar to Figure 3 showing the action of the invention to prevent sag between the trailer and the automobile;

Figure 5 is a plan view similar to Figure 2 wherein a modified form of the invention is shown; and Figure 6 is an enlarged sectional view of the modification, taken on the line 6—6 of Figure 5.

Referring now to the drawings and to Figure 1 in particular, my invention is shown as connecting a tow car 10 to a trailer 11. The trailer 11 has at its forward end an A-shaped towing frame 12. At the front of the towing frame 12, a reenforcing plate 13 is mounted, which has at its forward end a tubular bearing member 14. A depending channel section 15 is rotatably secured to the plate 13 by means of a pin 16 extending through the flanges of the channel 15 and through the tubular bearing member 14.

At the lower edge of the depending channel 15, a forwardly extending member 17 is fixed, this member 17 has at its forward end a socket which forms half of a ball and socket joint 18 which I use as the universal connection in this invention. A frame 19 is secured to the body of the tow car 10 and extends rearwardly of the tow car under the rear bumper for a short distance. At the rear edge of this frame 19 a ball 20 is mounted; the ball forming the other half of the ball and socket connection 18.

Since the only attachment between the frame 19 on the tow car 10 and the A frame 12 on the trailer 11 is through, first, the universal joint 18 at the lower edge of the channel 15 and, second, the rotatable connection formed by the pin 16 and the bearing tube 14 at the upper edge of the channel 15, there must be some means to prevent the weight of the trailer 11 and the force exerted in pulling the trailer 11 from causing the channel 15 to rotate about the two rotatable connections and cause the channel 15 to swing back to a horizontal position. The means provided in my invention to prevent this action (see Figures 3 and 4) comprises a leaf spring 21 having one end fixed to the member 17 by a bolt 22 and having its other end rotatably secured to a pin 23. The pin 23 is mounted on links 24. The upper ends of the links 24 are rotatably secured by a pin 25 to lugs 26 which are formed on a cross member 27. The member 27 forms a portion of the towing frame 12 of the trailer 11. As shown in Figure 3, a trapezoid is formed by the channel 15, the tow frame 12, the links 24 and the leaf spring 21. Each joint of this trapezoid is rotatable with the exception of the bolt 22 joining together the spring 21 and the channel 15. However, the resiliency of the spring 21 serves to permit the trapezoid to be moved out of the position shown in Figure 3. The weight of the front of the trailer on the hitch and the drag of the trailer try to swing the upper pivot of the channel 15, formed by the bearing tube 14 and the pin 16 backwards with respect to the universal connection 18. As this happens, the links 24 must swing forwardly and upwardly since the spring 21 cannot be elongated. This movement tensions the leaf spring 21 as shown in Figure 4. The leaf spring 21 then limits the motion and prevents the joint from sagging, but provides the resiliency which is necessary between the two vehicles 10 and 11 for road travel.

In order to prevent the spring 21 from causing the mechanism from moving forward past the center position shown in Figure 3, I provide a push bar 28 extending forwardly from the channel 15. The push bar 28 is mounted near the upper edge of the channel 15 at about the same level as the pin 16 and tubular bearing 14. The push bar contacts a wear plate 29 which is mounted between the ball 20 and the bumper of the tow car 10, on the frame 19. The push bar 28 and wear plate 29 comprise stop means limiting forward pivotal movement of the member 15 about the universal joint 18. The wear plate 29 is curved as shown best in Figure 2, so that when the tow car 10 turns, the push bar 28 may be held in the same relationship as before. The action of the push bar 28 wiping across the wear plate 29, as the trailer 11 pivots about the universal connection 18, serves as a damper to the side swaying action of the trailer 11 during travel.

In the modified form of the invention, shown in Figure 5 and Figure 6, the leaf spring and link mechanism is not used. The means whereby the tow frame 12, and the channel 15 are restrained from swaying backwardly and downwardly due to the pull on the trailer 11 and the weight of the trailer 11, are comprised of two coil springs 30 and 31, which extend rearwardly from the lower edge of the channel 15. The rear ends of the springs 30 and 31 are attached to eye bolts 32, which extend from the springs 30 and 31 rearwardly under the trailer body. The eye bolts 32 are adjustably secured by nuts 33 to frame pieces 34 that depend from the trailer frame so that the springs 30 and 31 may be tensioned as desired.

With this construction, the channel 15, the tow frame 12, the depending frames 34, and the coil springs 30 and 31, form a rough parallelogram (see Figure 6). The joint formed by the tow frame 12 and the depending frames 34 is rigid, so that the parallelogram may only be moved from the position shown in Figure 6 by lengthening one leg, which means extending the coil springs 30 and 31. These members then, serve to limit the sag in the joint, and yet provide the resiliency necessary for the hitch.

The two constructions described, each provide a hitch which is stiffened against sag, damps side sway, and yet has but one universal connector which must be fastened and unfastened when it is desired to transport the trailer.

It is believed that the nature and advantages of my invention appear clearly in the foregoing description and the accompanying drawings.

Having thus described my invention, I claim:

1. A coupling device for securing a trailer to a powered vehicle comprising a forwardly extending tow frame mounted at the front of the trailer, a vertical member depending from the front of the tow frame, pivot means connecting the upper edge of the depending member to the front of the tow frame, a universal joint connecting the rear of the powered vehicle and the lower edge of the depending member, a wear plate secured to the powered vehicle and positioned between the powered vehicle and the universal connection and extending above the universal connection, a push rod mounted at the upper edge of the depending member and extending forwardly into contact with the wear plate, a leaf spring secured to the depending member near its lower edge and extending rearwardly, and a link member rotatably suspended from the tow frame and spaced behind the depending member, the rear end of the leaf spring being rotatably attached to the free end of the link member.

2. A coupling device for securing a trailer to a powered vehicle comprising a forwardly extending tow frame mounted at the front of the trailer, a vertical member depending from the front of the tow frame, pivot means connecting the upper edge of the depending member to the front of the tow frame, a universal joint connecting the rear of the powered vehicle and the lower edge of the depending member, a wear plate secured to the powered vehicle and positioned between the powered vehicle and the universal connection and extending above the universal connection, a push rod mounted at the upper edge of the depending member and extending forwardly into contact with the wear plate, and spring means connecting the lower end of the depending member to the trailer and tending to turn the upper end of the depending member toward the powered vehicle.

References Cited in the file of this patent

UNITED STATES PATENTS

| | | |
|---|---|---|
| 1,812,733 | Ainslie | June 30, 1931 |
| 1,986,231 | Thomas | Jan. 1, 1935 |
| 2,151,920 | Jandus et al. | Mar. 28, 1939 |
| 2,341,965 | Wagner | Feb. 15, 1944 |
| 2,634,986 | McDaniel | Apr. 14, 1953 |
| 2,643,891 | Mosley | June 30, 1953 |

FOREIGN PATENTS

| | | |
|---|---|---|
| 328,848 | Great Britain | May 8, 1930 |